J. HOGAN.
Car Coupling.
No. 201,922. Patented April 2, 1878.
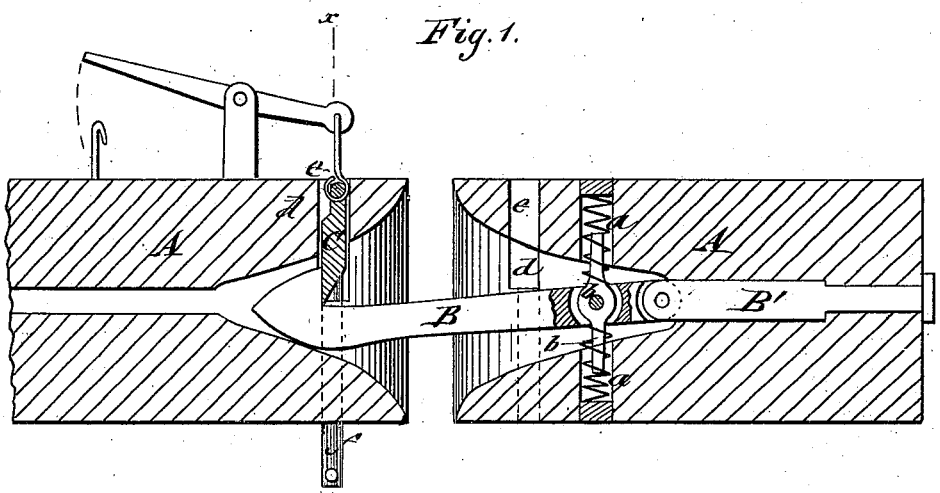
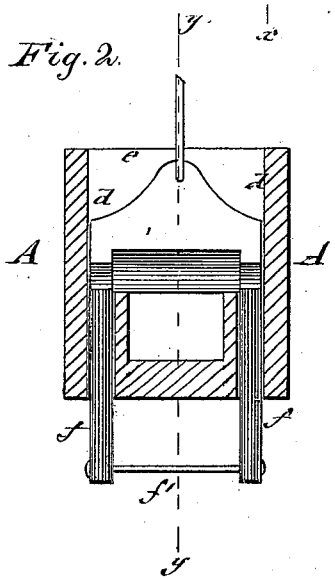
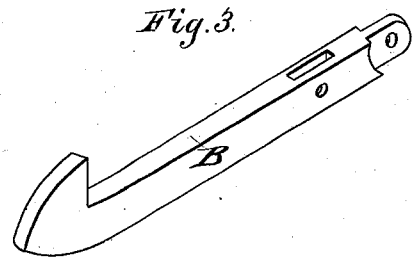
WITNESSES:
Henry N. Miller
C. Sedgwick
INVENTOR:
J. Hogan
BY Munn & Co
ATTORNEYS.

UNITED STATES PATENT OFFICE.

JOHN HOGAN, OF FORT WORTH, TEXAS.

IMPROVEMENT IN CAR-COUPLINGS.

Specification forming part of Letters Patent No. 201,922, dated April 2, 1878; application filed January 8, 1878.

*To all whom it may concern:*

Be it known that I, JOHN HOGAN, of Fort Worth, in the county of Tarrant and State of Texas, have invented a new and Improved Car-Coupling, of which the following is a specification:

In the accompanying drawings, Figure 1 represents a vertical longitudinal section on line $y\ y$, Fig. 2; Fig. 2, a vertical transverse section on line $x\ x$, Fig. 1; and Fig. 3, a perspective view of the draw-bar detached.

Similar letters of reference indicate corresponding parts.

The invention will first be described in connection with the drawing, and then pointed out in the claim.

Referring to the drawings, A represents the draw-head of my improved car-coupling, and B the draw-bar, which is hinged to a center bar, B', that passes through the draw-head, and is firmly attached to the same.

The draw-hook B is supported between cushioning-springs $a$, that are placed above and below the draw-bar, into recesses of the draw-head, and around a centrally-fulcrumed cross-piece, $b$, of the draw-bar, as shown in Fig. 1.

The draw-bar is, by the springs, held in horizontal position for facilitating the entrance of the link, and also for producing the intimate connection with a drop gate or catch, C, of the connecting draw-head when the draw-heads are coupled. Each draw-head is provided with a draw-bar, as well as with a drop-gate, which couple, respectively, with the drop-gate and draw-bar of the connecting draw-head.

The front end of the draw-bar is made in the shape of a hook, and curved at the top and bottom of the hook portion, so as to pass easily along the curved mouth of the draw-head. The drop gate or catch C is guided by side recesses $d$ and a lateral top slot, $e$, of the draw-head, and also by guide-rods $f$, that pass through perforations of the draw-head, and are connected by a cross-strap, $f'$, at their lower ends. The drop-gate C rests, when lowered for coupling, with the draw-bar at such a distance from the bottom of the draw-head that the draw-bar is locked and prevented from uncoupling. The side recesses extend only as far down as required by this position of the drop-gate, and form seats for supporting the drop-gate.

For uncoupling, the drop-gate is raised by means of a lever and chain, or other suitable mechanism, until the cross-strap of the guide-rods comes in contact with the bottom of the draw-head and prevents the detaching of the gate.

The lower part of the drop-gate is beveled at the front, so as to facilitate the entrance of the draw-bar into the cavity of the draw-head, and the raising of the gate by the hook end until the latter has passed back of the same, when the gate is dropped, so as to lock thereby the draw-bar. As each draw-head has a drop-gate and draw-bar, a double interlocking is obtained, so as to form a strong and reliable coupling device.

I am aware that it is not new to make a hook-ended draw-bar in two pieces, the front pivoted to the rear one.

What I claim as new is—

The bar B, pivoted at its rear end to the bar B', and provided with a vertical slot, as shown and described, in combination with the springs $a\ a$, arranged in recesses of draw-head, and coiled about the opposite arms of the cross-pin $b$, fastened in said slot of the bar B, for the purpose specified.

JOHN HOGAN.

Witnesses:
 LEVI WILSON,
 WM. WESTBROOK.